United States Patent [19]

Hewitt

[15] 3,675,482

[45] July 11, 1972

[54] AUTOMATIC TENSION SENSING APPARATUS FOR BELT CONVEYOR

[72] Inventor: John H. Hewitt, Tallmadge, Ohio
[73] Assignee: Goodyear Tire & Rubber Company, Akron, Ohio
[22] Filed: Oct. 14, 1970
[21] Appl. No.: 80,636

[52] U.S. Cl. ............................... 73/144, 198/208
[51] Int. Cl. ............................................. G01l 5/06
[58] Field of Search ............................. 73/143, 144

[56] References Cited

UNITED STATES PATENTS

| | | | |
|---|---|---|---|
| 2,353,249 | 7/1944 | Lebourg | 73/144 |
| 2,758,472 | 8/1956 | Bowen, Jr. | 73/144 |
| 2,826,065 | 3/1958 | Grimes | 73/141 AB |
| 3,538,763 | 11/1970 | Amtsberg et al. | 73/136 R |

FOREIGN PATENTS OR APPLICATIONS

| | | | |
|---|---|---|---|
| 837,615 | 6/1960 | Great Britain | 73/144 |
| 990,811 | 5/1965 | Great Britain | 73/144 |

Primary Examiner—Charles A. Ruehl
Attorney—F. W. Brunner and Frederick K. Lacher

[57] ABSTRACT

A sensitive measurement of tension in a belt is provided by movement of a belt carrying pulley mounted on a pivoted arm extending from the pivot to a position beyond the pulley where a calibrated spring permits limited movement of the arm in opposition to belt forces on the pulley. The movement of the arm actuates limit switches which are operatively connected to a take-up pulley mechanism for maintaining the desired tension in the belt.

8 Claims, 5 Drawing Figures

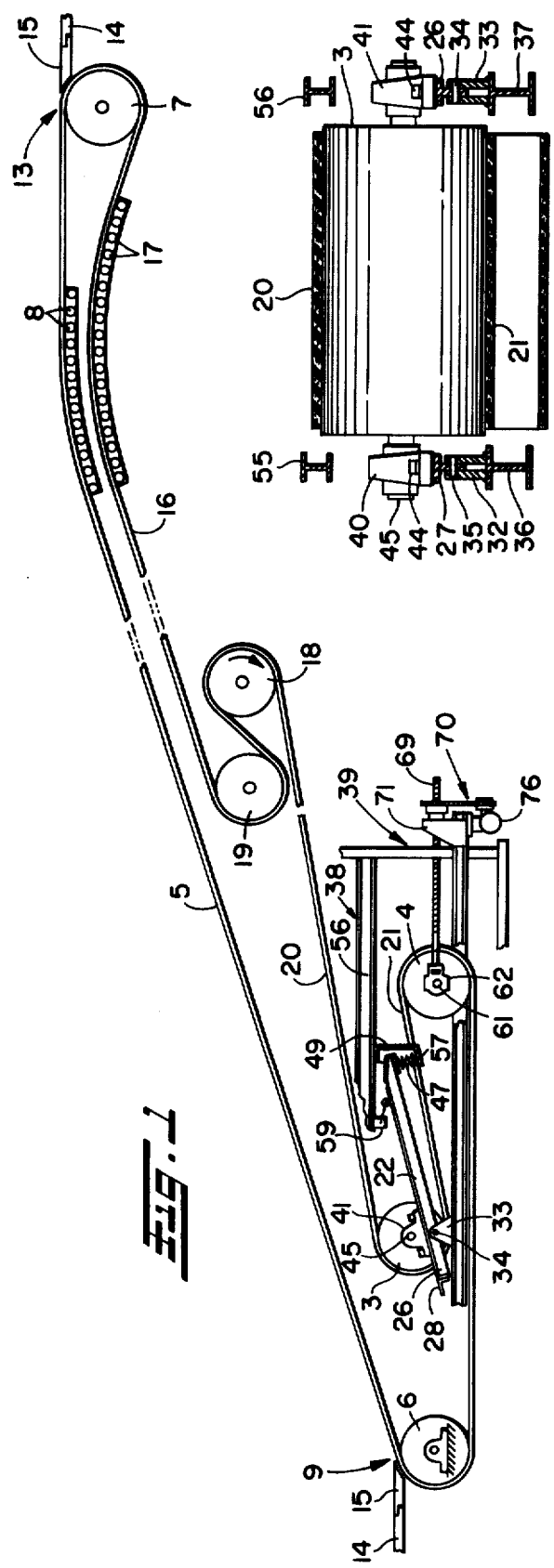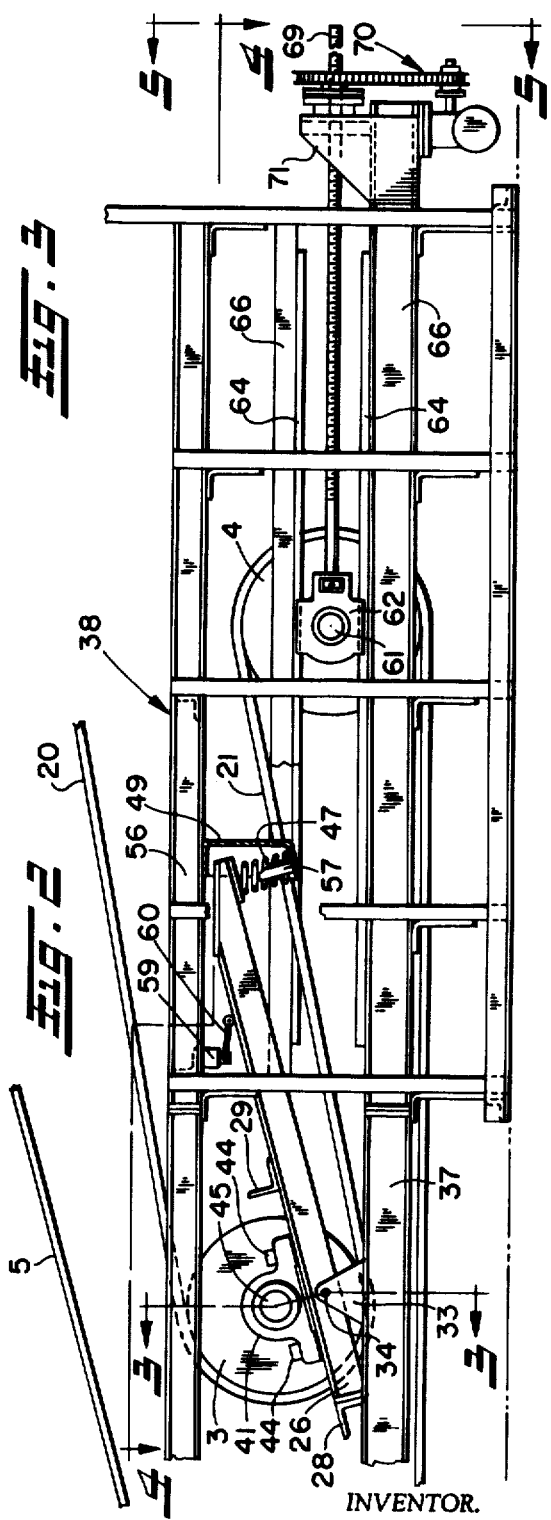

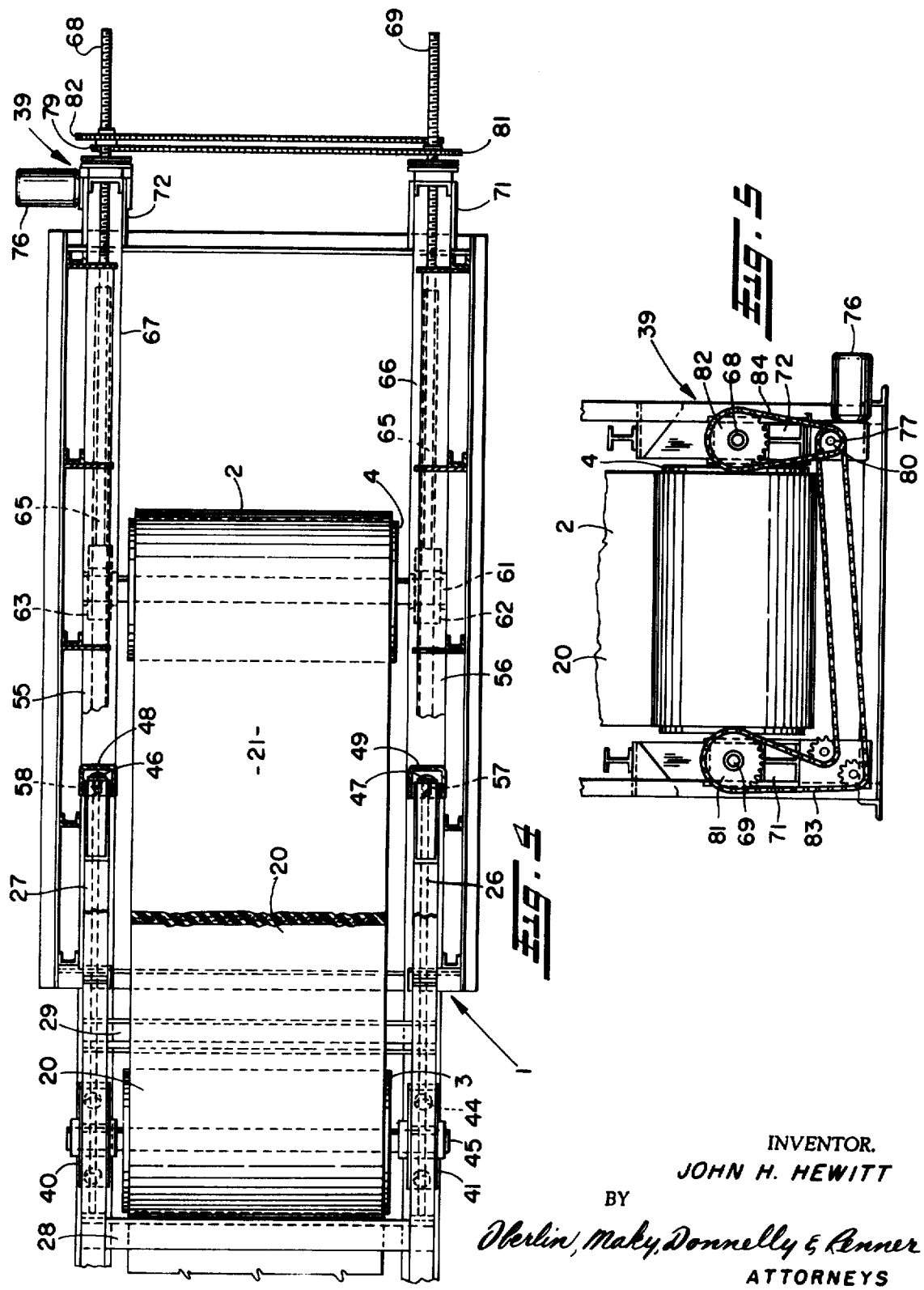

AUTOMATIC TENSION SENSING APPARATUS FOR BELT CONVEYOR

This invention relates generally to a tension indicating apparatus for belt type conveyors and more particularly to a tension sensing apparatus for a passenger conveyor system in which the belt tension on the slack side of the driving pulley is sensed and automatic adjustments are made to the belt tension when a need for these adjustments is indicated by the apparatus.

Passenger conveyor systems of the moving belt type run continuously under varying loads. For example, a conveyor in an airport has periods of maximum load when planes are arriving or departing and other periods of minimum load when few or no planes are arriving or departing. For efficient operation of the conveyor system it is desirable that the tension in the belt be maintained within a certain range so that there will be sufficient frictional engagement between the drive pulley and the belt to prevent slippage or creeping of the belt which causes undesirable jerks in the belt movement and also results in abnormal wear of the belt when the tension is not sufficient. On the other hand if the tension is greater than necessary, the strain on the conveyor system will lead to abnormal wear and early failure of the belt and other parts of the system.

Spring loaded take-up pulleys or weighted take-up systems have been used on belt conveyor systems in the past to provide an adjustment for the varying loads on a conveyor to change the tension in the slack side of the belt; however, none of these devices have been capable of adjusting the tension of the belt within specific limits through an independent measuring and indicating apparatus which is not part of the take-up adjusting apparatus. The prior devices have also operated with heavy duty weights or springs and therefore have not had the sensitivity to measure relatively small changes in tension and make adjustments accordingly.

It is therefore the principal object of this invention to provide a tension measuring means for a belt conveyor with a tension measuring pulley for carrying large belt loads and a leverage means for reducing the measured load.

Another object of the invention is to provide for mounting the pulley on an arm which is pivoted for rotation in response to changes in tension in the belt passing around the pulley.

A further object of this invention is to provide a calibrated spring for engagement with the pulley arm assembly whereby deflection of the spring indicates the tension in the belt passing around the pulley.

A still further object is to provide for positioning the pulley and the spring relative to the pivot of the arm so that maximum sensitivity is provided with a relatively small spring.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In the drawings:

FIG. 1 is a schematic side elevational view of a passenger conveyor system including a preferred form of tension sensing apparatus constructed in accordance with this invention.

FIG. 2 is an enlarged side elevational view of the tension sensing apparatus and take-up mechanism of FIG. 1.

FIG. 3 is a cross sectional view taken along the plane of line 3—3 of FIG. 2;

FIG. 4 is a plan view taken along the plane of line 4—4 of FIG. 2.

FIG. 5 is an end view in elevation of the take-up apparatus taken along the plane of line 5—5 of FIG. 2.

Referring now in detail to the drawings and first especially to FIG. 1, there is shown a belt tension indicating apparatus 1 in a conveyor system in which an endless belt 2 for conveying passengers or objects passes around a tension measuring pulley 3 of the belt tension indicating apparatus and then around a take-up pulley 4 responsive to the belt tension for adjustment thereof.

In the embodiment shown, the conveyor is of the type used for carrying passengers from one level to another level and the belt 2 has an upper run 5 extending from a lower terminal pulley 6 to an upper terminal pulley 7 with rollers 8 supporting the belt at the convex portion thereof. Other rollers not shown may be provided along the edges of the belt 2 to support the upper run 5 at other positions between the lower terminal pulley 6 and upper terminal pulley 7.

Although conveyors of this type may be reversible, the conveyor shown is in the condition where the entrance end 9 is at the lower terminal pulley 6 and the exit end 13 is at the upper terminal pulley 7. The landing platforms 14 and floating combs 15 may be provided at the entrance end 9 and exit end 13. Balustrades, not shown, may also be provided at each side of the belt 2 and have handrails movable at the same speed as the belt.

A lower run 16 of the belt 2 extends from the upper terminal pulley 7 to the lower terminal pulley 6 and may pass over guide rollers 17 at the convex portion of the lower run or other portions where the belt needs to be directed. A main drive pulley 18 is located intermediate the upper terminal pulley 7 and the tension measuring pulley 3 and may be connected to a motor or other means for turning the pulley in the clockwise direction as shown by the arrow. An idler pulley 19 adjacent the drive pulley 18 carries the lower run 16 from the guide rollers 17 to the main drive pulley 18.

Between the drive pulley 18 and the take-up pulley 4 of the lower run 16 is an upper reach 20 and a lower reach 21 which are in substantially parallel relationship. An arm member 22 extends generally parallel and between the upper reach 20 and lower reach 21 to a position spaced from the tension measuring pulley 3. The arm member 22 has arms 26 and 27 at the sides and are connected by transverse members such as angles 28 and 29. Each of the arms 26 and 27 are pivotally supported by brackets 32 and 33 having pins 34 and 35 extending through the arms and brackets in a direction parallel to the axis of the tension measuring pulley 3. The brackets 32 and 33 are fastened as by welding to structural members 36 and 37 of a supporting structure 38 for the belt tension indicating apparatus 1 and a tension adjusting apparatus 39.

Pillow blocks 40 and 41 are fastened to the arms 26 and 27 as by bolts 44 and contain journals for carrying a shaft 45 of the tension measuring pulley 3. As shown in the drawings and especially FIGS. 1, 2 and 3, the axis of the shaft 45 of the tension measuring pulley 3 is above the axis of the pins 34 and 35 pivotally mounting the arms 26 and 27 on the brackets 32 and 33 so that the tension in the upper reach 20 and lower reach 21 of the belt 3 tends to rotate the arm member 22 in a clockwise direction around the pins 34 and 35.

The arms 26 and 27 extend between the upper reach 20 and lower reach 21 a substantial distance from the pivotal connection at pins 34 and 35 where a spring means such as coil springs 46 and 47 engage the arm member 22 to resist clockwise turning of the member as a result of the belt tension. The springs 46 and 47 may engage the arms 26 and 27 at positions which are at least nine times the distance between the pins 34 and 35 and the axis of the shaft 45 of the tension measuring pulley 3. The coil springs 46 and 47 may be of steel and calibrated for a desired deflection at certain loading. Hanging brackets 48 and 49 are mounted on upper structural members 55 and 56 and have upperwardly projecting pins 57 and 58 over which the coil springs 46 and 47 are placed and supported in operating position.

In order to measure the movement of the arm member 22 resulting from the change in tension in the belt upper reach 20 and lower reach 21 acting on the tension measuring pulley 3 and deflecting the coil springs 46 and 47, a sensing means such as a limit switch 59 is mounted on the upper structural member 55 and has an arm 60 extending outward into engagement with the surface of arm 26. This arm 60 may be spring loaded to maintain engagement with the arm 26 of the arm member 22 and is preferably spaced from the pivotal connection at pins 34 and 35 to provide for greater throw of the arm member 22 than at the portions closer to the pivotal connection.

As shown in the drawings, the take-up pulley 4 is mounted along the belt path of the lower run 16 between the tension measuring pulley 3 and the lower terminal pulley 6. A shaft 61 of the take-up pulley 4 is supported at either end by crossheads 62 and 63 which are supported on slides 64 and 65 mounted at spaced-apart positions on intermediate structural members 66 and 67 for movement of the crossheads and the take-up pulley toward or away from the tension measuring pulley 3.

Threaded rods 68 and 69 are fastened to the crossheads 62 and 63 and extend in a direction away from the tension measuring pulley 3 to the end of the supporting structure 38 and to a drive mechanism 70 mounted on the supporting structure by brackets 71 and 72. A drive motor 76 which may be reversible is connected to a drive shaft 77 through a suitable transmission and rotates sprockets 79 and 80 which are connected to drive sprockets 81 and 82 by chains 83 and 84. The drive sprockets 81 and 82 are threaded on the rods 68 and 69 and journaled in the brackets 71 and 72 to permit rotation but restrain movement of the sprockets in the direction of the crossheads 62 and 63. It can be seen that by actuating the motor 76 and turning the sprockets 81 and 82, the rods 68 and 69 may be moved causing the crossheads 62 and 63 to move and thereby increase or decrease the tension in the lower run 16 of the belt 2.

Suitable connections are provided between the limit switch 59 and the motor 76 of a type well known in the art so that when the arm member 22 moves in a clockwise direction, as shown in FIG. 2, a predetermined amount as in the case of increased belt tension caused by an increased load on the upper run 5 of the belt 2, this will actuate the motor 76 to turn the sprockets 81 and 82 in a direction to permit the crossheads 62 and 63 to move towards the tension measuring pulley 3 and thereby move the take-up pulley 4 in that direction releasing the tension in the belt. As the tension in the belt is released, the calibrated springs 46 and 47 will urge the arm member 22 in a counterclockwise direction causing the arm 60 of the limit switch 59 to be lifted and at a predetermined position to actuate the motor 76 to turn the sprockets 81 and 82 in the opposite direction to move the crossheads 62 and 63 away from the tension measuring pulley 3 and thereby move the take-up pulley 4 in the same direction increasing the tension in the belt 2. It is understood that in a range between the two positions set forth above, the motor 76 will not be actuated and the crossheads 62 and 63 will remain in a stationary position holding the take-up pulley 4 in that position where the belt tension is in the range desired for operation.

Although the take-up pulley 4 is shown in this embodiment actuated by threaded rods 68 and 69 through a motor 76, it is to be understood that other types of take-up mechanisms may be used with the belt tension indicating apparatus 1 of this invention. For example, with a horizontal moving walkway the take-up pulley may be mounted on a movable carriage carrying nuts at each end through which stationary rotatable rods are threaded. The rods are mounted in bearings and turned by a drive mechanism to move the nuts and thereby adjust the position of the carriage and the take-up pulley. It is also understood that even though the present invention is primarily designed for passenger conveyors, it can be used for other conveyors and belt systems if desired.

While certain representative embodiments and details have been shown for the purpose of illustrating the invention, it will be apparent to those skilled in the art that various changes and modifications may be made therein without departing from the spirit or scope of the invention.

I claim:

1. A belt tension indicating apparatus comprising a pulley, pulley means at one side of said pulley for carrying reaches of the belt to and from said pulley and directing the belt tension forces on said pulley in the direction of said pulley means, a swingable supporting member on which said pulley is mounted extending in the direction of said pulley means between the reaches of the belt, spring means in engagement with said swingable supporting member and with a fixed body for deflection in response to belt tension forces exerted against said pulley in the direction of said pulley means and sensing means responsive to swinging movement of said support member for indicating the tension in said belt.

2. A belt tension indicating apparatus according to claim 1 wherein said supporting member comprises an arm member having a pivotal mounting at a position adjacent the axis of said pulley and spaced from said spring means.

3. A belt tension indicating apparatus according to claim 2 wherein said pulley is mounted on said arm with the axis of said pulley at a position which is closer to said pivotal mounting of said arm member than the position where said spring means engages said arm member to minimize the size of the spring means required to oppose the belt tension forces on said pulley means.

4. A belt tension indicating apparatus according to claim 3 wherein said sensing means engages said arm member at a position spaced from said pivotal mounting of said arm member whereby the movement of said arm member at said sensing means is sufficient to measure the deflection of said spring means corresponding to a predetermined range of belt tensions.

5. A belt tension indicating apparatus according to claim 4 wherein said spring means is a coil spring deflected in compression by tension in the belt.

6. A belt tension indicating apparatus according to claim 2 wherein the axis of said pulley is spaced from said arm member in a direction normal to said arm member and said spring means is spaced from said pivotal mounting in a direction parallel to said arm member.

7. A tension indicating apparatus according to claim 6 wherein the distance between said pivotal mounting of said arm member and the position where said spring means engages said arm member is over nine times the distance between said pivotal mounting and the axis of said pulley.

8. A belt tension indicating apparatus according to claim 2 wherein said arm member has two arms extending alongside the edges of the belt and said spring means includes a spring between each of said arms and said fixed body at the edges of the belt.

* * * * *